United States Patent
Sesia et al.

(10) Patent No.: US 10,064,214 B2
(45) Date of Patent: Aug. 28, 2018

(54) ENHANCED GRANT DETECTION METHOD

(71) Applicant: Telefonaktiebolaget LM Ericsson (Publ), Stockholm (SE)

(72) Inventors: Stefania Sesia, Roquefort les Pins (FR); Göran Bergman, Lund (SE); Waikwok Kwong, Solna (SE); Gerardo Agni Medina Acosta, Märsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 210 days.

(21) Appl. No.: 15/128,792

(22) PCT Filed: Mar. 31, 2015

(86) PCT No.: PCT/SE2015/050391
§ 371 (c)(1),
(2) Date: Sep. 23, 2016

(87) PCT Pub. No.: WO2015/152806
PCT Pub. Date: Oct. 8, 2015

(65) Prior Publication Data
US 2018/0220446 A1    Aug. 2, 2018

Related U.S. Application Data

(60) Provisional application No. 61/972,818, filed on Mar. 31, 2014.

(51) Int. Cl.
*H04L 1/18*     (2006.01)
*H04W 72/14*    (2009.01)
(Continued)

(52) U.S. Cl.
CPC ............ *H04W 72/14* (2013.01); *G06N 7/005* (2013.01); *H04L 1/0061* (2013.01); *H04W 24/08* (2013.01)

(58) Field of Classification Search
CPC ... H04L 1/0045; H04L 1/0061; H04L 5/0092; H04L 5/0055; H04W 52/225; H04W 72/042
See application file for complete search history.

(56) References Cited

U.S. PATENT DOCUMENTS

2002/0046382 A1* 4/2002 Yang ..................... H03M 13/03
                                                              714/758
2005/0235192 A1* 10/2005 Bernadac ............. H04L 1/0054
                                                              714/781
(Continued)

FOREIGN PATENT DOCUMENTS

WO    2012034100 A1    3/2012

OTHER PUBLICATIONS

International Search Report and Written Opinion dated Sep. 22, 2015 for International Application Serial No. PCT/SE2015/050391, International Filng Date—Mar. 31, 2015 consisting of 14-pages.
(Continued)

*Primary Examiner* — Asad M Nawaz
*Assistant Examiner* — Syed S Ali
(74) *Attorney, Agent, or Firm* — Sage Patent Group

(57) ABSTRACT

A method and system to reduce a probability of incorrect interruption of an uplink transmission of a wireless device are disclosed. According to one aspect, decoding of a sequence of bits obtained from a signal received by the wireless device is performed without knowing whether the sequence corresponds to one of a grant for uplink transmission and noise. Decoding of the sequence of bits is performed to determine a probability metric associated with a first m bits of the sequence, where m is an integer greater than 1. The probability metric is compared to a threshold. The received signal is interpreted as having a grant sequence if the probability metric is greater than the threshold. The (Continued)

received signal is interpreted as noise if the probability metric is not greater than the threshold.

2 Claims, 5 Drawing Sheets

(51) Int. Cl.
  *H04L 1/00* (2006.01)
  *H04W 24/08* (2009.01)
  *G06N 7/00* (2006.01)

(56) References Cited

U.S. PATENT DOCUMENTS

| | | | |
|---|---|---|---|
| 2007/0033478 A1* | 2/2007 | Shieh | H04L 1/0038 714/758 |
| 2011/0083065 A1 | 4/2011 | Singh et al. | |
| 2011/0182385 A1 | 7/2011 | Doan et al. | |
| 2013/0223252 A1* | 8/2013 | Perets | H04L 1/0045 370/252 |

OTHER PUBLICATIONS

3GPP TS 25.211 V11.4.0 (Jun. 2013) 3rd Generation Partnership Project; Technical Specification Group Radio Access Network; Physical Channels and Mapping of Transport Channels onto Physical Channels (FDD), (Release 11) Jun. 26, 2013 consisting of 63-pages.

3GPP TS 25.212 V11.6.0 (Sep. 2013) 3rd Generation Partnership Project; Technical Specification Group Radio Access Network; Multiplexing and Channel Coding (FDD) (Release 11) Sep. 20, 2013 consisting of 127-pages.

3GPP TSG-RAN WG1 Meeting #76-Bis, R1-141692, Shenzhen, P_R. China, Title: "Comparative Analysis of TDM Scheduler Schemes for Secondary Carriers," Source: Ericsson, Document for Discussion and Decision, Agenda Item: 6.4.1.2, Mar. 31-Apr. 4, 2014 consisting of 7-pages.

Extended European Search Report dated Oct. 23, 2017 for European Application Serial No. 15774013.5, International Filng Date—Mar. 31, 2015 consisting of 15-pages.

3GPP TSG-RAN WG1 Meeting #74-BIS, R1-134831, Guangzhou, P.R. China, Title: "TP on TDM Scheduling Solutions," Source: Broadcom Corporation, Document for Discussion, Agenda Item: 6.5.1, Oct. 7-11, 2013 consisting of 10-pages.

3GPP TSG-RAN WG4 Meeting #70-BIS, R4-141496, San Jose del Cabo, Mexico, Title: "UE performance impact for EUL enhancement feature," Source: Ericsson, Document for Discussion, Agenda Item: 7.18.1, Mar. 31-Apr. 4, 2014 consisting of 3-pages.

* cited by examiner

ENHANCED GRANT DETECTION METHOD

CROSS-REFERENCE TO RELATED APPLICATIONS

This application is a Submission Under 35 U.S.C. § 371 for U.S. National Stage Patent Application of International Application Number: PCT/SE2015/050391, filed Mar. 31, 2015 entitled "ENHANCED GRANT DETECTION METHOD," which claims priority to U.S. Provisional Application Ser. No. 61/972,818, filed Mar. 31, 2014, the entirety of both which are incorporated herein by reference.

TECHNICAL FIELD

This written description relates to wireless communication, and in particular to a method and system for reducing a probability of incorrect interruption of an uplink transmission of a wireless device.

BACKGROUND

In wireless systems, a base station communicates with a wireless device by transmitting information to the wireless device on a downlink channel and receiving information from the wireless device on an uplink channel. Because many wireless devices may be trying to send information to the base station at the same time, a mechanism is provided to control which wireless device may transmit on the uplink to the base station during a specified time slot. This mechanism includes transmitting, to a wireless device, a grant sequence of bits that informs the wireless device that the wireless device is selected for uplink transmission. The grant sequence is typically transmitted to the wireless device via a dedicated channel.

The enhanced dedicated channel (E-DCH) Absolute Grant Channel (E-AGCH) is a fixed rate (30 kbps, SF=256) downlink physical channel that carries uplink E-DCH absolute grants for uplink E-DCHs associated with the E-AGCH set by higher layer signaling. As used herein, higher layer signaling means signaling at an open system interconnect (OSI) layer higher than OSI layer 2. FIG. 1 illustrates the frame 2 and sub-frame 4 structure of the E-AGCH. An E-DCH absolute grant is transmitted over one E-AGCH sub-frame 4 or one E-AGCH frame 2, depending on the E-DCH transmission time interval (TTI) to be used by a wireless device such as a user equipment (UE). The TTI can be set either to 2 ms or 10 ms. The Absolute Grant Value is transmitted using the E-AGCH. The Absolute Grant Value consists of 5 bits Xagv,1, Xagv,2, . . . , Xagv,5. In addition a 1 bit Absolute Grant Scope, Xags,1, is appended to these five bits.

The Absolute Grant Value information is specified in tables that are selected by higher layer signaling and which indicate how to perform the mapping of an index described in terms of bits to a power ratio. The Absolute Grant Scope is an activation flag used for (de)activating individual hybrid automatic repeat request (ARQ). The Absolute Grant Value information Xagv,1, Xagv,2, . . . , Xagv,5 and the Absolute Grant Scope information Xags,1 are multiplexed together. This gives a sequence of bits Xag,1, Xag,2, Xag,6 where $$Xag,k = Xagv,k \; k=1,2,\ldots,5$$

$$Xag,k = Xags,7-k \; k=6 \quad (1)$$

The E-RNTI stands for the E DCH Radio Network Temporary Identifier, and is mapped such that xid,1 corresponds to the most significant bit (MSB). From the sequence of bits Xag,1, Xag,2, . . . , Xag,6 a 16 bit cyclic redundancy code (CRC) is calculated. That gives the sequence of bits c1, c2, . . . , c16 where $$c_k = P_{im(17-k)} \; k=1,2,\ldots,16$$

This sequence of bits is then masked with xid,1, xid,2, . . . , xid,16 and appended to the sequence of bits Xag,1, Xag,2, . . . , Xag,6 to form the sequence of bits y1, y2, . . . , y22 where $$yi = Xag,i \; i=1,2,\ldots,6$$

$$yi = (ci-6+xid,i-6) \bmod 2 \; i=7,\ldots,22 \quad (2)$$

Rate ⅓ convolutional coding is applied to the sequence of bits y1, y2, . . . , y22, resulting in the sequence of bits z1, z2, . . . , z90. From the input sequence $$z1,z2,\ldots,z90 \quad (3)$$

the bits z1, z2, z5, z6, z7, z11, z12, z14, z15, z17, z23, z24, z31, z37, z44, z47, z61, z63, z64, z71, z72, z75, z77, z80, z83, z84, z85, z87, z88, z90 are punctured to obtain the output sequence $$r1,r2,\ldots,r60. \quad (4)$$

The sequence of bits r1, r2, . . . , r60 is mapped to the corresponding E-AGCH sub frame. The bits $r_k$ are mapped so that they are transmitted over the air in ascending order with respect to k. If the E-DCH TTI is equal to 10 ms the same sequence of bits is transmitted in all the E-AGCH sub frames of the E-AGCH radio frame.

Thus, to recover the grant bit sequence, a receiving wireless device must de-puncture and decode the received signal on the E-AGCH.

On the secondary carrier, the UEs are supposed to transmit sequentially by following a time division multiplex (TDM) operation. The TDM operation can be performed by using the legacy E-AGCH. However, the following disadvantages have been identified:

Signaling Overhead: two E-AGCHs must be signaled, one for starting the data transmission, and one more for stopping the data transmission;

Scheduling Efficiency: the above activation/deactivation signaling overhead leads to a gap between the data transmissions of different UEs; and Serious consequences arise from missed detection of the terminating grant, such as collisions of uplinks from multiple wireless devices.

Methods have been proposed to avoid the drawbacks found in legacy systems. For example, when a grant is sent, the wireless device, e.g., user equipment (UE) keeps quiet and does not transmit if the CRC of the detected message is incorrect, otherwise the wireless device can start the transmission and continue transmission until detecting an incorrect CRC in the grant. In particular, the method consists of sending the grant information to a certain wireless device to indicate that the wireless device can start its uplink transmission. Then, discontinuous transmission (DTX) is used until another wireless device has to be granted.

When a wireless device detects that a grant for uplink transmission is for the wireless device, then the wireless device can start transmitting in the uplink. If the wireless device detects that a grant is sent for another wireless device, then the wireless device should stop transmitting immediately. Note that the terms "wireless device" and "UE" may be used herein interchangeably to denote a wireless device such as a mobile phone, computer, tablet computer, iPad, and the like. Embodiments are not limited to devices such as mobile phones.

Currently, requirements for the E-AGCH are defined only in terms of missed detection probability. According to this method, the UE transmits only if successful decoding of the grant occurs, while the wireless device stops transmitting if the wireless device detects that a grant was sent to someone else. Let:

Case A=wireless device 'U' successfully decodes its grant;

Case B=The E-AGCH is in DTX;

Case C=The NodeB transmits the grant for wireless device 'U'; and

Case D=The NodeB transmits the grant for wireless device 'K'. Several important events can occur as follows:

Missed detection: 1—Pr(A|C) corresponds to the usual missed detection probability, i.e. the wireless device 'U' cannot correctly detect its grant and hence the wireless device U does not start transmitting. This is linked to the CRC length, hence the missed detection probability is considered to be sufficiently low.

Wrong grant detection probability: Pr(A|D). This probability corresponds to the case when the wireless device 'U' decodes that a grant is sent for wireless device U when the network instead was transmitting a grant aimed for another wireless device. This condition happens with very low probability as again it is linked to the CRC length and the use of the E-RNTI as a mask. When this event happens, it can create a collision in uplink between 2 users.

False alarm probability: Pr(A|B). This corresponds to the conditional probability that the wireless device 'U' detects its grant given that no grant has been transmitted. This metric is already defined and the same requirement could be considered as valid also for this method. This probability is again linked to the CRC length and it is considered to be sufficiently small. However the corresponding complementary probability can be very high, 1—Pr(A|B). The complementary probability can be considered as the sum of two events, i.e.:

(1) the wireless device detects that nothing is transmitted (and hence it continues its uplink transmission if the wireless device was transmitting) even though nothing has been transmitted (2) the wireless device detects that a grant is sent to someone else given that nothing has been transmitted (and hence the wireless device stops its uplink transmission if the wireless device was transmitting)

In particular, for event (2), if the corresponding probability is not sufficiently negligible, this may lead to several interruptions in the wireless device transmission with negative consequences on the overall achieved throughput. There is a large potential probability during DTX that the wireless device wrongly detects that a grant is sent for another wireless device, which would lead to frequent wrong interruption of its uplink transmission.

SUMMARY

Some embodiments advantageously provide a method and system to reduce a probability of incorrect interruption of an uplink transmission of a wireless device. According to one aspect, decoding of a sequence of bits obtained from a signal received by the wireless device is performed without knowing whether the sequence corresponds to one of a grant for uplink transmission and noise. Decoding of the sequence of bits is performed to determine a probability metric associated with a first m bits of the sequence, where m is an integer greater than 1. The probability metric is compared to a threshold. The received signal is interpreted as having a grant sequence if the probability metric is greater than the threshold. The received signal is interpreted as noise if the probability metric is not greater than the threshold.

According to this aspect, in some embodiments, the method also include determining a cyclic redundancy code check if the probability metric is greater than the threshold. A positive CRC check indicates that the grant sequence is for the wireless device, and a negative CRC check indicates that the grant sequence is for a different wireless device. In some embodiments, m=6 and the sequence corresponds to absolute grant value information and absolute grant scope information. In some embodiments, the method further includes generating, using a decoder, a decision-reliability metric, the decision-reliability metric used to determine the threshold. In some embodiments, the decoder is a maximum likelihood decoder. In some embodiments, the decoder is a convolutional decoder and the decision-reliability metric is an "s" metric being an output of the convolutional decoder representing a reliability of the decoding, and where the probability metric being greater than the threshold is given by $M_s \geq \tau_{AGCH}{}^s$, where $M_s$ is the s metric and $\tau_{AGCH}{}^s$, is the threshold.

In some embodiments, the probability metric is a log-likelihood metric given by $\Lambda(y_i)=\text{Log } (\text{Prob}(y_i=1)/\text{Prob }(y_i=-1)) \; \forall i=1 \ldots m$, where y is a sequence of bits obtained from the signal received by the wireless device and the probability metric being greater than the threshold is defined by the condition $D=\{\Lambda(y_i)>T \; \forall i=1 \ldots m\}$ where T is the threshold. In some embodiments, the sequence of bits, y, is obtained from the signal received by the wireless device by a process that includes depuncturing of a sequence, z, in the received signal. Since in order to fulfill the condition D all of the elements in the received sequence of bits y have to be above the threshold T, then equivalently the received signal can also be distinguished from noise when the conditional operator is inverted and the threshold condition is fulfilled for any of the elements of the sequence of bits y. Therefore, in some embodiments, the probability metric being less than the threshold is defined by the condition $D=\{\Lambda(y_i)<T$, for any $i=1 \ldots m\}$, where T is the threshold.

According to another aspect, embodiments include a wireless device having a memory and a processor in communication with the memory. The memory is configured to store executable program code, a sequence of bits obtained from a received signal, and a threshold. The processor is configured to execute the executable program code to decode the sequence of bits obtained from the received signal, without knowing whether the sequence corresponds to one of a grant for uplink transmission and noise. The decoding enables determination of a probability metric associated with receiving a first m bits of the sequence, where m is an integer greater than 1. The probability metric is compared to the threshold. A processor determines that the received signal has a grant sequence if the probability metric is greater than the threshold; and determines that the received signal is noise if the probability metric is not greater than the threshold.

According to this aspect, in some embodiments, when the processor determines that the received signal has a grant sequence, the processor is further configured to perform a cyclic redundancy code, CRC, check to determine whether a CRC check is positive. A positive CRC check indicates that the grant sequence is for the wireless device, and a negative CRC check indicates that the grant sequence is for a different wireless device. In some embodiments, m=6 and the sequence corresponds to absolute grant value information and absolute grant scope information. In some embodiments, the processor is further configured to generate a decision-reliability metric that is used to determine the threshold.

In some embodiments, the decoding is maximum likelihood decoding. In some embodiments, the decoding is convolutional decoding and the decision-reliability metric is an "s" metric being output by the decoding and representing a reliability of the decoding and where the probability metric being greater than the threshold is given by $M_s \geq \tau_{AGCH}^s$, where $M_s$ is the s metric and $\tau_{AGCH}^s$, is the threshold.

In some embodiments, the probability metric is a log-likelihood metric given by: $\Lambda(y_i)=\text{Log }(\text{Prob}(y_i=1)/\text{Prob}(y_i=-1))$ $\forall i=1 \ldots m$ where y is a sequence of bits obtained from the signal received by the wireless device and the probability metric being greater than the threshold is defined by the condition $D=\{\Lambda(y_i)>T \forall i=1 \ldots m\}$ where T is the threshold. In some embodiments, the sequence of bits, y, is obtained from the signal received by the wireless device by a process that includes depuncturing of a sequence, z, in the received signal. In some embodiments, the probability metric being less than the threshold is defined by the condition $D=\{\Lambda(y_i)<T,$ for any $i=1 \ldots m\}$, where T is the threshold.

According to another aspect, some embodiments include a wireless device. The wireless device includes a decoder module configured to decode a sequence of bits obtained from a signal received by the wireless device, without knowing whether the sequence corresponds to one of a grant for uplink transmission and noise, to determine a probability metric associated with receiving a first m bits of the sequence, where m is an integer greater than 1. The wireless device also includes a comparator module configured to compare the probability metric to a threshold. Also, a decision module is configured to determine that the received signal has a grant sequence if the probability metric is greater than the threshold; and to determine that the received signal is noise if the probability metric is not greater than the threshold.

According to this aspect, in some embodiments, the wireless device further includes a cyclic redundancy code, CRC, check module, configured to perform, when the decision module determines that the received signal has a grant sequence, a CRC check to determine whether a CRC check is positive. A positive CRC check indicates that the grant sequence is for the wireless device. A negative CRC check indicates that the grant sequence is for a different wireless device. In some embodiments, m=6 and the sequence corresponds to absolute grant value information and absolute grant scope information.

In some embodiments, the decoder module generates a decision reliability metric used to determine the threshold. In some embodiments, the decision-reliability metric is an s metric representing a reliability of the decoding. In some embodiments, the probability metric is a log-likelihood metric given by $\Lambda(y_i)=\text{Log }(\text{Prob}(y_i=1)/\text{Prob}(y_i=-1))$ $\forall i=1 \ldots m$, where y is a sequence of bits obtained from the signal received by the wireless device and the probability metric being greater than the threshold is defined by the condition $D=\{\Lambda(y_i)>T \forall i=1 \ldots m\}$ where T is the threshold. In some embodiments, the sequence of bits, y, is obtained from the signal received by the wireless device by a process that includes depuncturing of a sequence, z, in the received signal. In some embodiments, the probability metric being less than the threshold is defined by the condition $D=\{\Lambda(y_i)<T,$ for any $i=1 \ldots m\}$, where T is the threshold.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
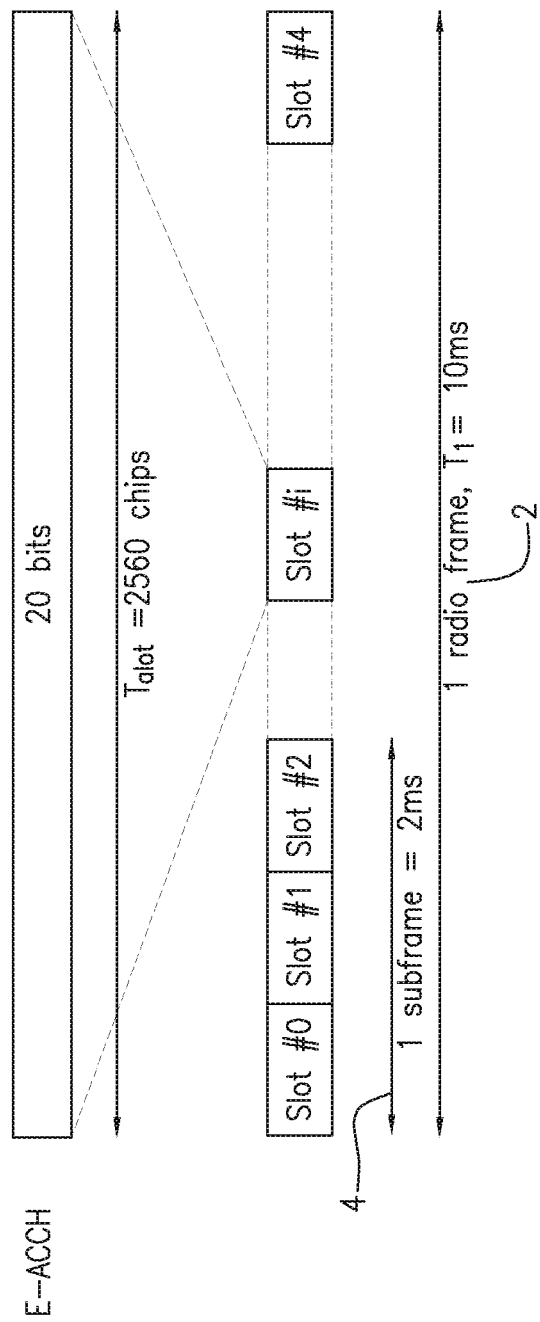
FIG. 1 is a diagram of the frame and sub-frame structure of the E-AGCH.

Before describing in detail example embodiments that are in accordance with the present disclosure, it is noted that the embodiments reside primarily in combinations of apparatus components and processing steps related to differentiating between a grant sequence and noise received at a wireless device and for reducing a probability of incorrect interruption of an uplink transmission of a wireless device. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements In some embodiments, a methodology to reduce the probability of wrong interruption of a wireless device uplink transmission is implemented. Embodiments described herein improve the reliability of DTX detection in order to decrease to an acceptable level the probability that a wireless device may wrongly detect that a grant is sent to someone else when nothing has actually been transmitted. In some embodiments, a wireless device decodes of a sequence of bits obtained from a signal received by the wireless device. The decoding is performed without knowing whether the sequence corresponds to a grant for uplink transmission or noise. Decoding of the sequence of bits is performed to determine a probability metric associated with a first m bits of the sequence, where m is an integer greater than 1. The probability metric is compared to a threshold. The received signal is interpreted as having a grant sequence if the probability metric is greater than the threshold. The received signal is interpreted as noise if the probability metric is not greater than the threshold. If the received signal is interpreted as having a grant sequence, a CRC check is performed to determine if the grant is to the wireless device or another wireless device.

In some embodiments, a method exploits the Viterbi decoder and the reliability associated with a certain amount of bits of the E-AGCH. In particular, a method may be based on running the Viterbi decoder on the received sequence without a priori knowledge of whether the sequence corresponds to a grant (for this or another wireless device) or noise. The output or the metric of the Viterbi decoder may be used to define a decision threshold based on a set of bits of the sequence.

In operation, the wireless device receives the sequence of 60 bits defined as $$s = Hr + n \quad (5)$$

if the Node B transmits a grant (for wireless device 'U' or wireless device 'K'), where $r=r1, r2, \ldots, r60$ is the 60 bits sequence corresponding to a grant (defined in Equation (4)), $n=n1, \ldots, n60$ is the noise sequence, and H the matrix corresponding to the wireless channel. If the Node B is using discontinuous transmission (DTX), the wireless device receives, instead:

$$s = n$$

When the sequence r is obtained by the Node B as the outcome of a rate ⅓ convolutional code applied to a 22 bit sequence with trellis termination, and then punctured to obtain 60 bits, the wireless device may exploit the decoder in order to reliably detect whether DTX was performed.

In some embodiments, the decoder, which may be implemented in order to decode a convolutional code, is a Viterbi decoder, and performs maximum likelihood decoding. A Viterbi decoder can be implemented in a soft manner, called a Soft Viterbi decoder whose output corresponds to soft reliability information.

The wireless device performs the following steps, as in the legacy E-AGCH receiver:

(1) The wireless device receives the sequence is defined in Equation (5);

(2) The wireless device applies de-puncturing on the sequence s and obtains the sequence z (as defined in Equation (3));

(3) The wireless device applies the decoder to the sequence z; and (4) The wireless device obtains the most likely sequence of 22 bits y of Eq. 2.

In the legacy case, the wireless device exploits the decoded sequence to check whether the CRC is correct in order to determine whether the transmitted grant is intended for the wireless device or for some other wireless device. However if the Node B has performed DTX, there is a large probability that the wireless device will not find a correct CRC check and hence may interpret noise as a grant sent to another user. This may cause the wireless device to erroneously discontinue its uplink transmission.

In order to ensure that the wireless device discriminates between the case when only 'noise' is received or the case when a grant is sent, the wireless device may perform the following additional steps:

Step (1) The wireless device selects the first m bits of sequence $y = y1, \ldots, ym$, as defined in Equation (2);

Step (2) In one embodiment the wireless device implements a soft decoder. The wireless device collects the log-likelihood associated with the first m bits $y_i$, i.e. $\Lambda(y_i) = \text{Log}(\text{Prob}(y_i=1)/\text{Prob}(y_i=-1))\ \forall i=1 \ldots m$. Note that other metrics related to the soft decoder can be applied, e.g., no Log (.) function, conditional probabilities, a-posteriori probabilities (APP), and extrinsic information.

(a) The wireless device defines a condition $D = \{\Lambda(y_i) > T \forall i=1 \ldots m\}$, where T is the threshold.

(b) If condition D is satisfied then the wireless device considers the received signal as a grant sequence and it applies known techniques in order to check, via the CRC, whether the grant sent is intended for it or for another wireless device.

(c) If condition D is not satisfied then the wireless device considers the received signal as noise.

Since in order to fulfill the condition D all of the elements in the received sequence of bits y have to be above the threshold T, then equivalently the received signal can also be distinguished from noise when the conditional operator is inverted and the threshold condition is fulfilled for any of the elements of the sequence of bits y. Therefore, in the alternative to the condition applied in (a) above, the wireless device may define the condition $D = \{\Lambda(y_i) < T,\ \text{for any}\ i=1 \ldots m\}$. If this condition is satisfied, the wireless device considers the received signal to be noise. Otherwise, the wireless device considers the received signal to contain a grant sequence, and applies known techniques to check, via the CRC, whether the grant sent is intended for it or another wireless device.

In step (2), in one embodiment, m=6 and the sequence used in order to detect DTX corresponds only to the information bits.

In step (2), in a different embodiment m can be any number from 6 to 22, i.e. the CRC bits are also used in order to detect whether only noise is received). Note that this algorithm exploits the fact that in case only noise is received it is likely that $\Lambda(bi)$ is close to 0. The higher in absolute level the values of $\Lambda(bi)$, the higher the probability that the sequence received is not noise.

In a different embodiment the wireless device implements the classical Viterbi decoder. The decision-reliability metric generated by the decoder to output the maximum likelihood hard sequence is used in order to compute a suitable threshold to distinguish case B from the cases C and D defined above. For convenience, cases A-D are repeated here:

Case A=wireless device 'U' successfully decodes its grant;

Case B=The E-AGCH is in DTX;

Case C=The NodeB transmits the grant for wireless device 'U'; and

Case D=The NodeB transmits the grant for wireless device 'K'.

Under the conditions defined in the preceding paragraph, in one embodiment, the decision reliability metric is the s metric commonly used in convolutional decoders and can be used to set the threshold. The s metric output from the convolutional decoder represents the reliability of the decoding. A threshold to distinguishing case B from cases C and D could be introduced. For example, If $M_s \geq \tau_{AGCH}^s$, where $M_s$ is the s matrix and $\tau_{AGCH}^s$ is the threshold, the wireless device would assume something is transmitted on the E-AGCH. The CRC check would then be used to distinguish between cases C and D. If the CRC check is positive, this would be regarded as case C. If the CRC check is negative, this would be regarded as case D. On the other hand, if $M_s < \tau_{AGCH}^s$, the wireless device would assume nothing is transmitted on the E-AGCH (case B).

Figure 2:
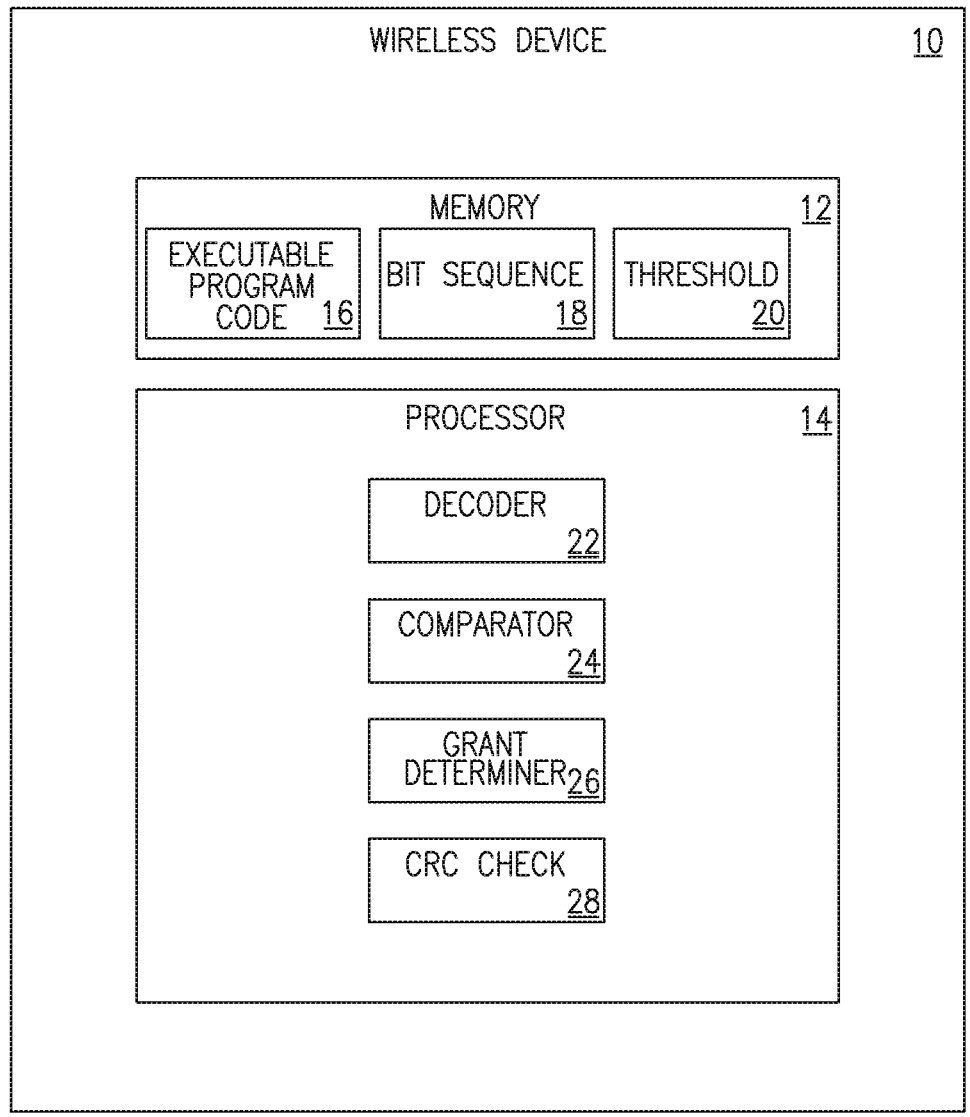
FIG. 2 is a block diagram of a wireless device constructed in accordance with embodiments described herein.

FIG. 2 is a block diagram of a wireless device 10 constructed in accordance with principles of the present invention. The wireless device 10 includes a memory 12 and a processor 14. The memory 12 includes executable program code 16, a bit sequence 18 and a threshold 20. In some embodiments, the executable program code 16, the bit sequence 18 and the threshold 20 may be stored in different non-contiguous memory. The executable program code 16, when executed by the processor 14, configures the processor to perform functions to differentiate a received bit sequence as being one of a grant or noise, and if a grant sequence is received to determine whether the grant is for the wireless device 10 or for another wireless device. The functions performed by the processor include decoding 22, comparison 24, grant determination 26 and CRC checking 28.

The decoder 22 decodes a sequence of bits of a signal received by the wireless device 10. This decoding takes place without knowing in advance whether the sequence corresponds to one of a grant for uplink transmission and noise. The decoder 22 determines a probability metric associated with receiving the first m bits of the sequence, where m is an integer greater than 1. The comparator 24 compares the probability metric to a threshold. The grant determiner 26 determines whether a grant sequence is received or whether noise is received. A determination is made that a grant sequence is received if the probability metric exceeds the threshold. Otherwise, a determination is made that noise is received. If the determination is made that a grant sequence is received, the CRC check function 28 performs a CRC check to determine whether a CRC check is positive, indicating that the grant sequence is for the wireless device, and whether the CRC check is negative, indicating that the grant sequence is for a different wireless device.

In some embodiments, the processor is further configured to generate a decision-reliability metric that is used to determine the threshold to which the probability metric is compared. The decision-reliability metric may be an s metric generated by convolutional decoding. The decoding may be maximum likelihood decoding. The probability metric may be a log-likelihood metric based on a sequence of bits obtained from the signal received by the wireless device.

Figure 3:
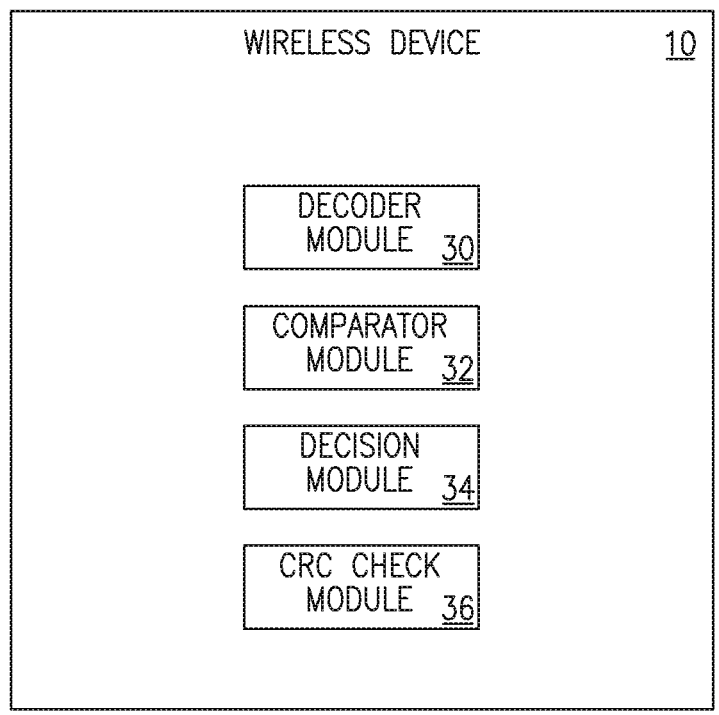
FIG. 3 is a block diagram of an alternative wireless device constructed in accordance with embodiments described herein.

An alternative embodiment of the wireless device 10 is shown in FIG. 3. FIG. 3 shows software modules that can be executed by a processor to differentiate a received bit sequence as being one of a grant or noise, and if a grant, then whether the grant is meant for the wireless device 10 or another wireless device. A decoder module 30 determines a probability metric associated with receiving the first m bits of the sequence, where m is an integer greater than 1. A comparator module 32 compares the probability metric to a threshold.

A decision module 34 determines whether a grant sequence is received or whether noise is received. A determination is made that a grant sequence is received if the probability metric exceeds the threshold. Otherwise, a determination is made that noise is received. If a grant is received, a CRC check module performs a CRC check to determine whether a CRC check is positive, indicating that the grant sequence is for the wireless device, and whether the CRC check is negative, indicating that the grant sequence is for a different wireless device.

Figure 4:
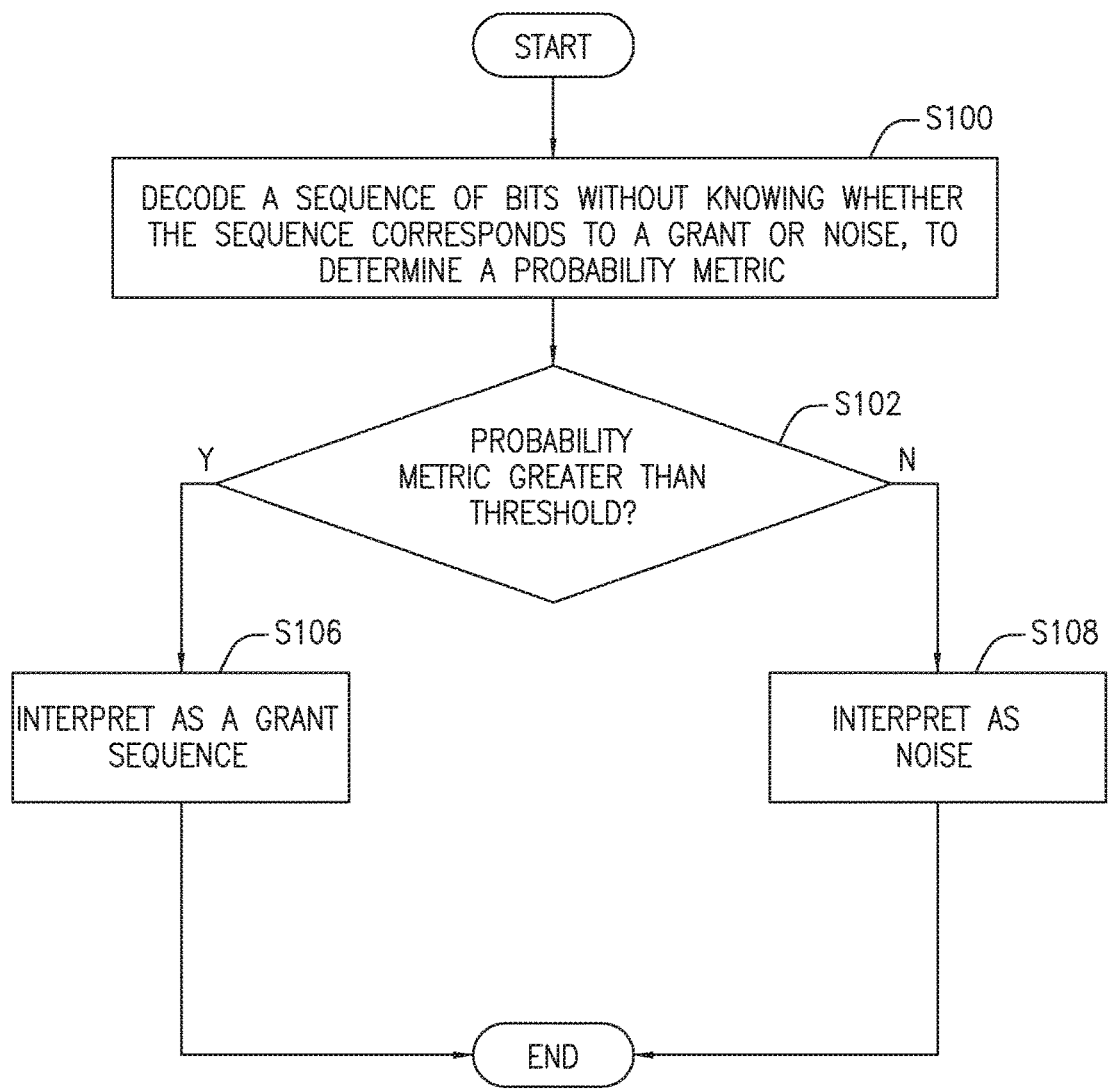
FIG. 4 is a flowchart of an exemplary process of differentiating between a grant sequence and noise.

FIG. 4 is a flowchart of an exemplary process for reducing a probability of incorrect interruption of an uplink transmission of a wireless device 10. A sequence of bits 18 in a received signal is decoded 22 without knowing whether the sequence corresponds to a grant or noise, to determine a probability metric (block S100). The probability metric is compared 24 to a threshold (block S102). If the probability metric is greater than the threshold (block S102), then the sequence is interpreted as a grant sequence (block S106). Otherwise, the sequence is interpreted as noise (block S108).

Figure 5:
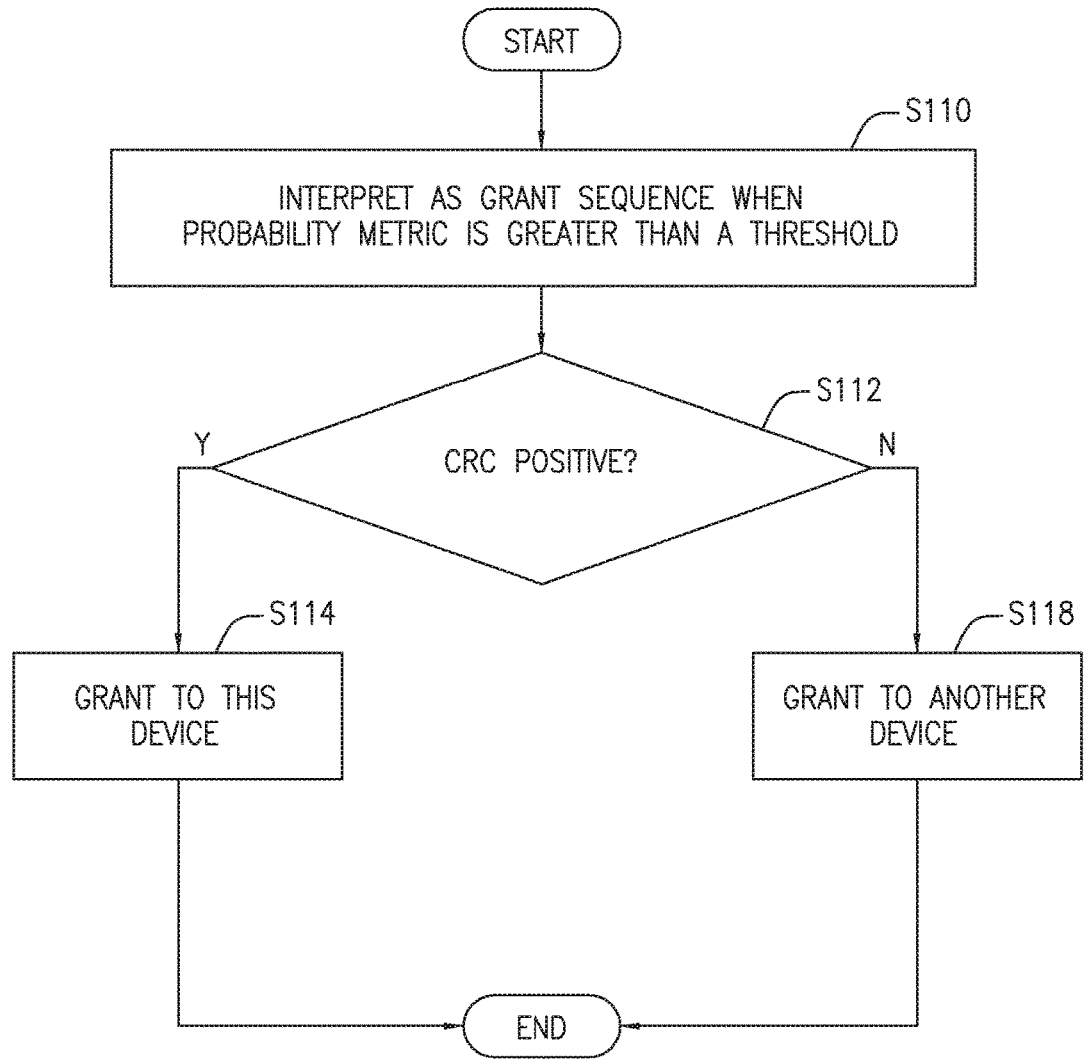
FIG. 5 is a flowchart of an exemplary process of determining whether a grant is for a one wireless device or another.

FIG. 5 is a flowchart of a continuation of the process used when the sequence is determined to be a grant sequence. When the probability metric is greater than the threshold the received sequence of bits 18 is interpreted as a grant sequence (block S110). If a CRC check 28 is positive, (block S112), the grant is interpreted as being a grant to the wireless device (block S114), whereas, if the CRC check 28 is negative, the grant is interpreted as being a grant to another wireless device (block S118).

Embodiments provide an efficient way to perform time domain scheduling where a wireless device's grant can be revoked implicitly by a grant sent to another wireless device. Otherwise, a wireless device might stop its transmission prematurely by mistaking pure noise as grant transmissions intended for other wireless devices.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method to reduce a probability of incorrect interruption of an uplink transmission of a wireless device, the method comprising:
    performing decoding of a sequence of bits obtained from a signal received by the wireless device, without knowing whether the sequence corresponds to one of a grant for uplink transmission and noise, to determine a probability metric associated with a first m bits of the sequence, where m is an integer greater than 1;
    comparing the probability metric to a threshold;
    treating the received signal as having a grant sequence if the probability metric is greater than the threshold;
    if the probability metric is greater than the threshold, then determining if a cyclic redundancy code, CRC, check is positive, a positive CRC check indicating that the grant sequence is for the wireless device, and a negative CRC check indicating that the grant sequence is for a different wireless device; and treating the received signal as noise if the probability metric is not greater than the threshold, wherein the probability metric is a log-likelihood metric given by: $\Lambda(y_i)=\text{Log }(\text{Prob}(y_i=1)/\text{Prob}(y_i=-1))\ \forall i=1\ldots m$ where y is a sequence of bits obtained from the signal received by the wireless device and the probability metric being greater than the threshold is defined by the condition $D=\{\Lambda(y_i)>T\ \forall i=1\ldots m\}$ where T is the threshold.

2. A wireless device, comprising:
- a memory configured to store:
  - executable program code;
  - a sequence of bits obtained from a received signal; and
  - a threshold; and
- a processor in communication with the memory, the processor configured to execute the executable program code to:
- decode the sequence of bits obtained from the received signal, without knowing whether the sequence corresponds to one of a grant for uplink transmission and noise, to determine a probability metric associated with receiving a first m bits of the sequence, where m is an integer greater than 1;
- compare the probability metric to the threshold;
- determine that the received signal has a grant sequence if the probability metric is greater than the threshold; and
- determine that the received signal is noise if the probability metric is not greater than the threshold, wherein, when the processor determines that the received signal has a grant sequence, the processor is further configured to perform a cyclic redundancy code, CRC, check to determine whether a CRC check is positive, a positive CRC check indicating that the grant sequence is for the wireless device, and a negative CRC check indicating that the grant sequence is for a different wireless device, and wherein the probability metric is a log-likelihood metric given by: $\Lambda(y_i)=\text{Log }(\text{Prob}(y_i=1)/\text{Prob}(y_i=-1))\ \forall i=1\ldots m$ where y is a sequence of bits obtained from the signal received by the wireless device and the probability metric being greater than the threshold is defined by the condition $D=\{\Lambda(y_i)>T\forall i=1\ldots m\}$ where T is the threshold.

* * * * *